United States Patent
Minagawa et al.

(10) Patent No.: US 10,802,503 B2
(45) Date of Patent: Oct. 13, 2020

(54) CONTROL SYSTEM OF TRANSPORTER VEHICLE, TRANSPORTER VEHICLE, AND CONTROL METHOD OF TRANSPORTER VEHICLE

(71) Applicant: Komatsu Ltd., Tokyo (JP)

(72) Inventors: Masanori Minagawa, Tokyo (JP); Hiroshi Fuji, Tokyo (JP); Kenta Osagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 289 days.

(21) Appl. No.: 15/578,380

(22) PCT Filed: Mar. 31, 2017

(86) PCT No.: PCT/JP2017/013799
§ 371 (c)(1),
(2) Date: Nov. 30, 2017

(87) PCT Pub. No.: WO2017/171073
PCT Pub. Date: Oct. 5, 2017

(65) Prior Publication Data
US 2018/0284808 A1 Oct. 4, 2018

(51) Int. Cl.
*G05D 1/02* (2020.01)
*G05D 1/00* (2006.01)
(Continued)

(52) U.S. Cl.
CPC ............ *G05D 1/0278* (2013.01); *G01C 21/20* (2013.01); *G01C 21/3605* (2013.01);
(Continued)

(58) Field of Classification Search
CPC .. G05D 1/0278; G05D 1/0044; G05D 1/0225; G05D 2201/0213; G05D 2201/021; G01C 21/20; G01C 21/3605
See application file for complete search history.

(56) References Cited

U.S. PATENT DOCUMENTS 10,139,821 B2   11/2018   Yamamura et al.
2002/0099481 A1  7/2002   Mori
(Continued)

FOREIGN PATENT DOCUMENTS

JP    H9149706 A    6/1997
JP    2002-215236 A  7/2002
(Continued)

OTHER PUBLICATIONS

Office Action dated Feb. 22, 2018, issued for the corresponding Australian patent application No. 2017239926.
(Continued)

*Primary Examiner* — Jaime Figueroa
(74) *Attorney, Agent, or Firm* — Locke Lord LLP

(57) ABSTRACT

A control system of a transporter vehicle includes a target position data calculation unit configured to calculate target position data of a target point of the transporter vehicle based on positional relationship between a target object whose position data has been identified, and the target point of the transporter vehicle that is input by an input device, and a course data generation unit configured to generate course data of the transporter vehicle at least based on the target position data.

7 Claims, 10 Drawing Sheets

(51) Int. Cl.
*G01C 21/20* (2006.01)
*G01C 21/36* (2006.01)

(52) U.S. Cl.
CPC ......... *G05D 1/0044* (2013.01); *G05D 1/0225* (2013.01); *G05D 2201/021* (2013.01); *G05D 2201/0213* (2013.01)

(56) References Cited

U.S. PATENT DOCUMENTS

| | | | | |
|---|---|---|---|---|
| 2004/0138799 | A1* | 7/2004 | Makela | G05D 1/0272 701/50 |
| 2009/0118889 | A1* | 5/2009 | Heino | B62D 12/02 701/24 |
| 2010/0076640 | A1* | 3/2010 | Maekawa | G05D 1/0217 701/26 |
| 2013/0054133 | A1* | 2/2013 | Lewis | G07C 5/0841 701/423 |
| 2013/0325208 | A1* | 12/2013 | Osagawa | E02F 9/205 701/2 |
| 2015/0077557 | A1* | 3/2015 | Han | B60R 11/04 348/148 |
| 2015/0292895 | A1* | 10/2015 | Lewis | G01C 21/3461 701/408 |
| 2016/0223350 | A1* | 8/2016 | Lewis | G01C 21/3407 |
| 2016/0229326 | A1* | 8/2016 | Uetake | B60P 1/32 |
| 2016/0282868 | A1 | 9/2016 | Yamamura et al. | |
| 2017/0017235 | A1* | 1/2017 | Tanaka | G05D 1/0027 |
| 2017/0018190 | A1* | 1/2017 | Yamasaki | H04W 4/44 |
| 2017/0220042 | A1* | 8/2017 | Sakai | E21F 13/00 |
| 2017/0220044 | A1* | 8/2017 | Sakai | G05D 1/0219 |
| 2017/0269591 | A1* | 9/2017 | Tanaka | G05D 1/0088 |
| 2017/0285655 | A1 | 10/2017 | Katou et al. | |
| 2018/0044888 | A1* | 2/2018 | Chi | G06Q 10/0631 |
| 2018/0068561 | A1* | 3/2018 | Hamada | G05D 1/0297 |
| 2018/0182248 | A1* | 6/2018 | Kanai | G08G 1/096775 |
| 2019/0064835 | A1* | 2/2019 | Hoofard | G05D 1/0225 |

FOREIGN PATENT DOCUMENTS

| | | |
|---|---|---|
| JP | 2012-113429 A | 6/2012 |
| JP | 2016-090864 A | 5/2016 |
| JP | 2016146061 A | 8/2016 |
| JP | 2016186750 A | 10/2016 |
| JP | 2017-016477 A | 1/2017 |
| WO | 2016/051988 A1 | 4/2016 |

OTHER PUBLICATIONS

International Search Report dated Jun. 6, 2017, issued for PCT/JP2017/013799.
Japanese Office Action dated May 19, 2020 in corresponding Japanese Patent Application No. 2018-207793 (no translation provided).

* cited by examiner

CONTROL SYSTEM OF TRANSPORTER VEHICLE, TRANSPORTER VEHICLE, AND CONTROL METHOD OF TRANSPORTER VEHICLE

FIELD

The present invention relates to a control system of a transporter vehicle, a transporter vehicle, and a control method of a transporter vehicle.

BACKGROUND

In wide-area work locations such as mines, transporter vehicles that travel with no human are used for a carrying work. After freight is loaded by a loader onto the transporter vehicles in a loading site, the transporter vehicles travel on a conveying road to an earth unloading site, and the freight is unloaded in the earth unloading site.

CITATION LIST

Patent Literature

Patent Literature 1: Japanese Laid-open Patent Publication No. 2012-113429 A

SUMMARY

Technical Problem

In transporter vehicles that travel with no human on travel routes of mines, if abnormality occurs in an ionization layer, the accuracy of a position detected using the Global Navigation Satellite System (GNSS) may deteriorate. As a result, productivity in mines may deteriorate.

The present invention has been devised in view of the foregoing, and the object of the present invention is to suppress a deterioration of productivity in a work location.

Solution to Problem

According to an embodiment of the present invention, a control system of a transporter vehicle comprises: a target position data calculation unit configured to calculate target position data of a target point of the transporter vehicle based on positional relationship between a target object whose position data has been identified, and the target point of the transporter vehicle that is input by an input device; and a course data generation unit configured to generate course data of the transporter vehicle at least based on the target position data.

Advantageous Effects of Invention

According to an aspect of the present invention, a deterioration of productivity in a work location can be suppressed.

DESCRIPTION OF EMBODIMENTS

An embodiment according to the present invention will be described below with reference to the drawings. Nevertheless, the present invention is not limited to this. Components in the embodiment to be described below can be appropriately combined. In addition, a part of components are not used in some cases.

First Embodiment

[Management System]

Figure 1:
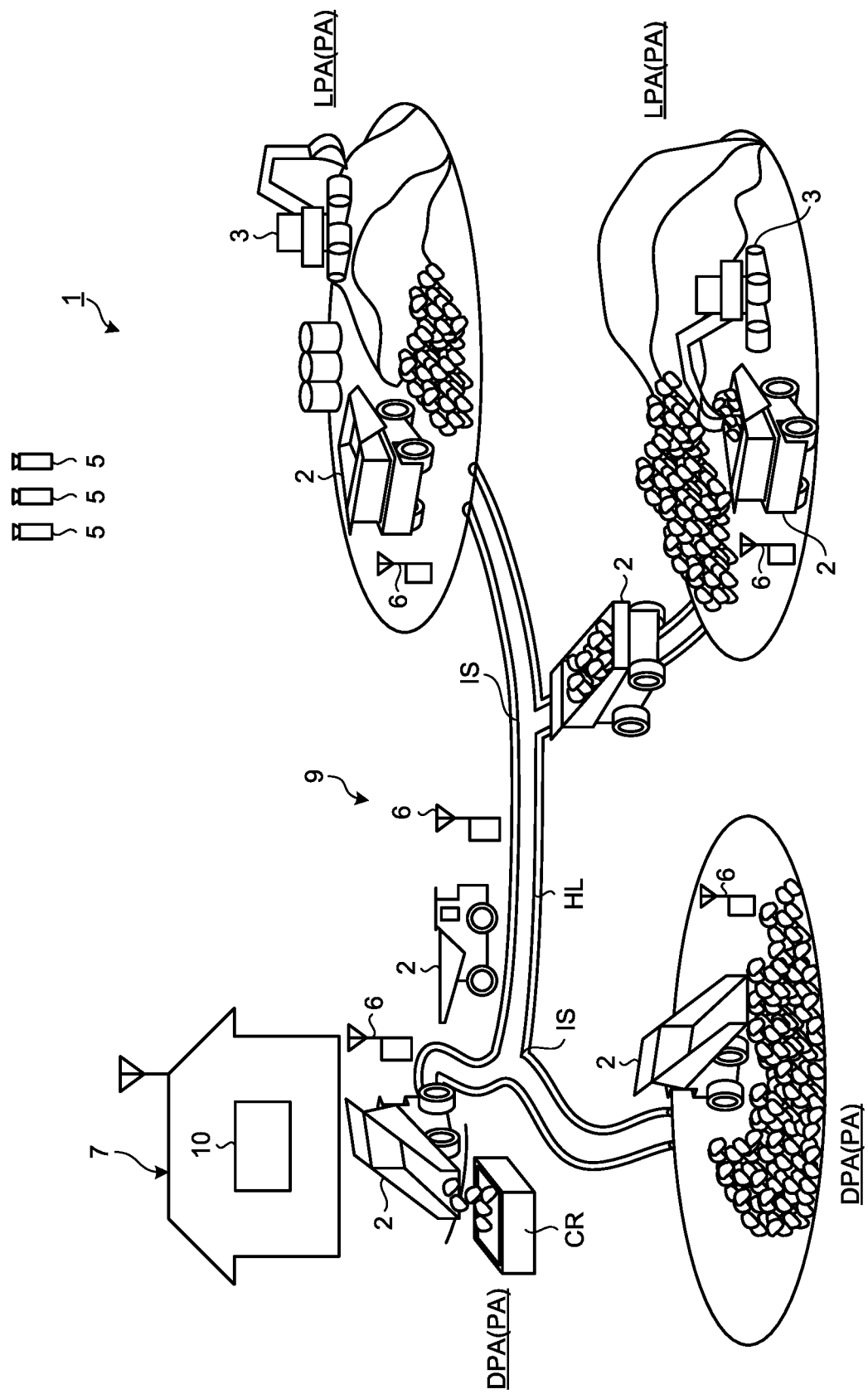
FIG. 1 is a diagram schematically illustrating an example of a management system of a transporter vehicle according to a first embodiment.

A management system 1 of a transporter vehicle 2 according to the present embodiment will be described. FIG. 1 is a diagram schematically illustrating an example of the management system 1 of the transporter vehicle 2 according to the present embodiment. The management system 1 executes travel management of the transporter vehicle 2. In the present embodiment, the transporter vehicle 2 is a dump truck 2 that can travel on mines.

As illustrated in FIG. 1, the dump truck 2 travels on at least part of a work location PA of a mine and a conveying road HL connecting to the work location PA. The work location PA includes at least either one of a loading site LPA and an earth unloading site DPA. The conveying road HL includes an intersection IS. The dump truck 2 travels according to course data CD set in the conveying road HL and the work location PA.

The loading site LPA is an area where a loading work of loading freight onto the dump truck 2 is executed. In the loading site LPA, a loader 3 like an excavator operates. The earth unloading site DPA is an area where an unloading work of unloading the freight from the dump truck 2 is executed. The earth unloading site DPA is provided with a crusher CR, for example.

The management system 1 includes a management apparatus 10 and a communication system 9. The management apparatus 10 includes a computer system, and is installed in a control facility 7 provided in the mine. The communication system 9 executes data communication and signal communication between the management apparatus 10 and the dump truck 2. The communication system 9 includes a plurality of relaying devices 6 that relay data and signals. The management apparatus 10 and the dump truck 2 perform wireless communication via the communication system 9.

In the present embodiment, the dump truck 2 is an unmanned dump truck that travels with no human and without operations of a driver. The dump truck 2 travels on the mine based on a command signal from the management apparatus 10.

In the present embodiment, a position of the dump truck 2 is detected using the Global Navigation Satellite System (GNSS). The GNSS includes a plurality of positioning satellites 5. The GNSS detects a position defined by coordinate data of latitude, longitude, and altitude. A position detected by the GNSS is an absolute position defined by a global coordinate system. An absolute position of the dump truck 2 in the mine is detected by the GNSS.

[Dump Truck]

Figure 2:
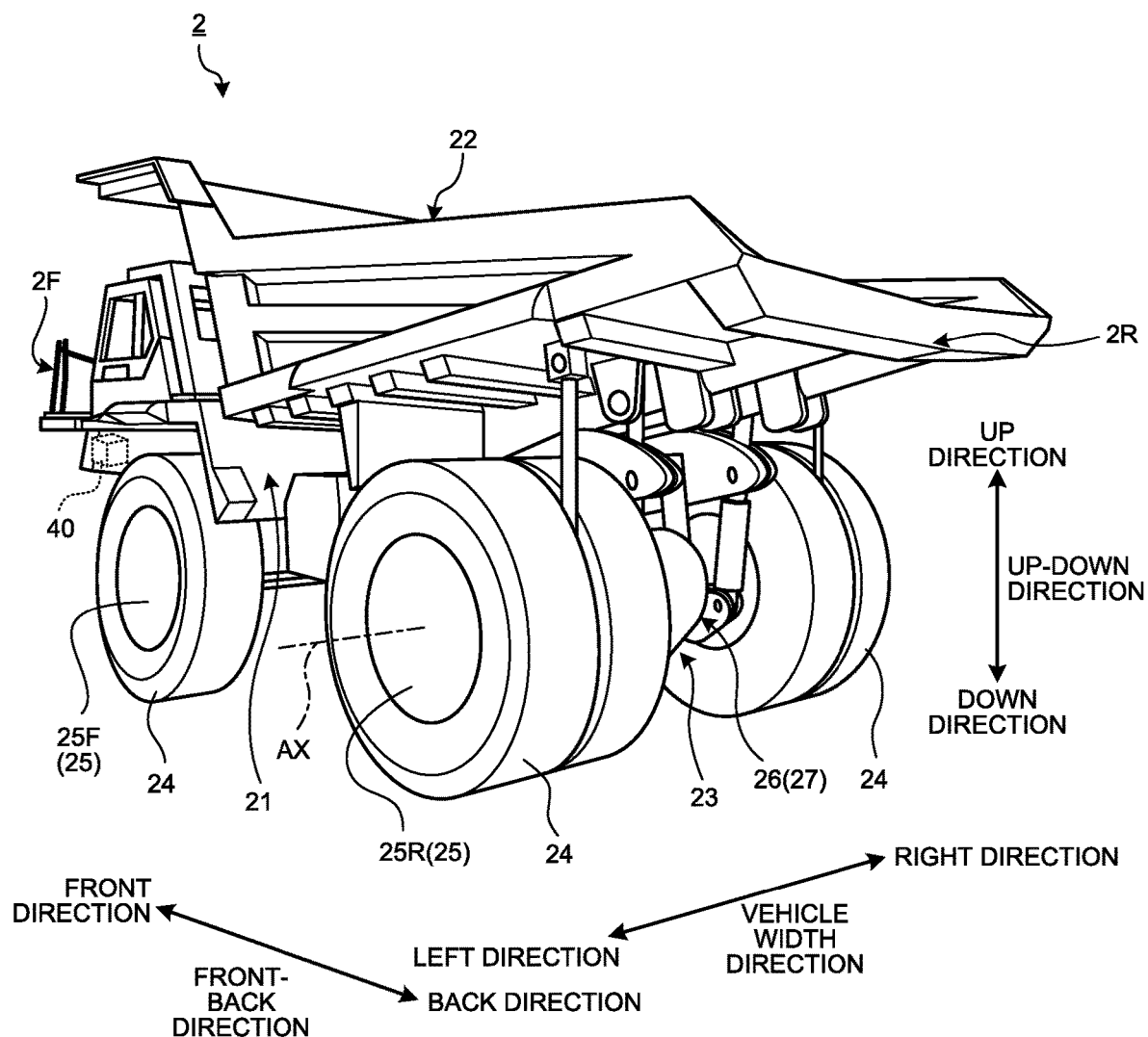
FIG. 2 is a perspective view in which a dump truck according to the present embodiment is viewed from a back direction.

Next, the dump truck 2 according to the present embodiment will be described. FIG. 2 is a perspective view in which the dump truck 2 according to the present embodiment is viewed from a back direction. As illustrated in FIG. 2, the dump truck 2 includes a vehicle body frame 21, a dump body 22 supported on the vehicle body frame 21, a travel apparatus 23 that travels with supporting the vehicle body frame 21, and a control apparatus 40.

The travel apparatus 23 includes wheels 25 to which tires 24 are attached. The wheels 25 include front wheels 25F and rear wheels 25R. The front wheels 25F are steered by a steering apparatus 33. The rear wheels 25R are not steered. The wheels 25 rotate around a rotation axis AX.

In the following description, a direction parallel to the rotation axis AX of the rear wheels 25R will be appropriately referred to as a vehicle width direction, a traveling direction of the dump truck 2 will be appropriately referred to as a front-back direction, and a direction vertical to both of the vehicle width direction and the front-back direction will be appropriately referred to as an up-down direction.

One of the front-back direction is a front direction and an opposite direction of the front direction is a back direction. One of the vehicle width direction is a right direction, and an opposite direction of the right direction is a left direction. One of the up-down direction is an up direction, and an opposite direction of the up direction is a down direction. The front wheels 25F are disposed anterior to the rear wheels 25R. The front wheels 25F are disposed on both sides in the vehicle width direction. The rear wheels 25R are disposed on both sides in the vehicle width direction. The dump body 22 is disposed superior to the vehicle body frame 21.

The vehicle body frame 21 supports a driving apparatus 31 that generates driving force for driving the travel apparatus 23. The dump body 22 is a member onto which freight is to be loaded.

The travel apparatus 23 includes a rear axle 26 that transmits driving force generated by the driving apparatus 31, to the rear wheels 25R. The rear axle 26 includes a wheel axis 27 that supports the rear wheels 25R. The rear axle 26 transmits driving force generated by the driving apparatus 31, to the rear wheels 25R. The rear wheels 25R rotates around the rotation axis AX, by the driving force supplied from the rear axle 26. The travel apparatus 23 thereby travels.

The dump truck 2 can go forward and backward. Going forward refers to traveling in a state in which an anterior portion 2F of the dump truck 2 faces the traveling direction. Going backward refers to traveling in a state in which a posterior portion 2R of the dump truck 2 faces the traveling direction.

The control apparatus 40 controls the dump truck 2. The control apparatus 40 can control the dump truck 2 based on a command signal transmitted from the management apparatus 10.

[Control System of Transporter Vehicle]

Figure 3:
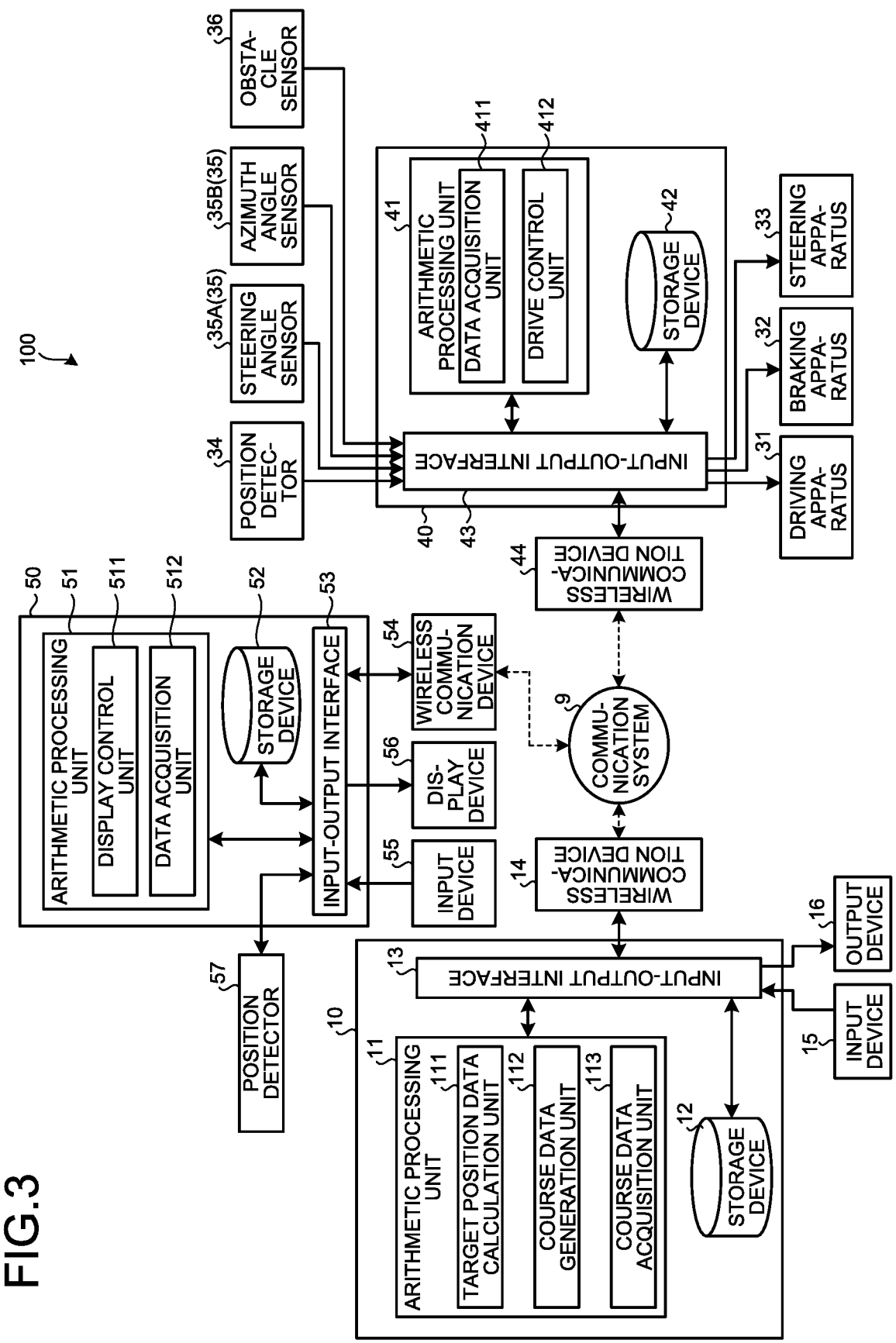
FIG. 3 is a functional block diagram illustrating an example of a control system of the transporter vehicle according to the present embodiment.

Next, a control system of the transporter vehicle according to the present embodiment will be described. FIG. 3 is a functional block diagram illustrating an example of a control system 100 of the transporter vehicle according to the present embodiment. The control system 100 of the transporter vehicle includes the management apparatus 10 installed in a management facility 7, the control apparatus 40 mounted on the dump truck 2, and a control apparatus 50 mounted on the loader 3. The management apparatus 10, the control apparatus 40, and the control apparatus 50 perform wireless communication via the communication system 9.

The management apparatus 10 includes a computer system. The management apparatus 10 includes an arithmetic processing unit 11 including a processor such as a central processing unit (CPU), a storage device 12 including a memory and a storage such as a read only memory (ROM) or a random access memory (RAM), and an input-output interface 13.

The management apparatus 10 is connected with a wireless communication device 14. The wireless communication device 14 is disposed in the control facility 7. The management apparatus 10 communicates with the dump truck 2 via the wireless communication device 14 and the communication system 9.

The management apparatus 10 is connected with an input device 15 and an output device 16. The input device 15 and the output device 16 are installed in the control facility 7. The input device 15 includes at least one of a computer keyboard, a mouse, and a touch panel, for example. Input data generated by the input device 15 being operated is output to the management apparatus 10. The output device 16 includes a display device. The display device includes a flat-panel display such as a liquid crystal display (LCD) or an organic electroluminescence display (GELD). The output device 16 operates based on display data output from the management apparatus 10. In addition, the output device 16 may be a printing device, for example.

The arithmetic processing unit 11 includes a target position data calculation unit 111, a course data generation unit 112, and a data acquisition unit 113.

The target position data calculation unit 111 calculates target position data of a target point of the dump truck 2 that is input by an input device in the work location PA. In the present embodiment, a target point of the dump truck 2 is, for example, a loading point of the loader 3. In addition, a target point of the dump truck 2 may be points other than the loading point of the loader 3. In addition, examples of the input device include the input device 15 of the management apparatus 10, an input device 55 of the loader 3, and the like.

In addition, in the present embodiment, the target position data of the target point of the dump truck 2 that is input by the input device includes, for example, when a parallel movement, a rotational movement, and the like of the target point are performed after the target point is input by the input device, position data that is obtainable after the parallel movement, the rotational movement, and the like are performed, and position data that is obtainable after a parallel movement and a rotational movement are performed using a method other than the input device.

The course data generation unit 112 generates the course data CD indicating a traveling condition of the dump truck 2 traveling on the mine. The course data generation unit 112 generates the course data CD of the dump truck 2 based on the target position data in the work location PA, for example. The traveling condition of the dump truck 2 includes at least one of a travel route, a travel speed, acceleration, deceleration, and a travel direction of the dump truck 2. In addition, the traveling condition of the dump truck 2 includes at least either one of a stop position and a departure position of the dump truck 2. In addition, the traveling condition of the dump truck 2 includes a direction in which the dump truck 2 stops.

The data acquisition unit 113 acquires course data indicating a traveling condition of the dump truck 2 that includes the course data CD of a travel route.

The input-output interface 13 outputs the course data CD generated by the course data generation unit 112, to the dump truck 2. The input-output interface 13 functions as an output unit that outputs the course data CD to the dump truck 2. The course data CD generated by the arithmetic processing unit 11 is output to the dump truck 2 via the input-output interface 13 and the communication system 9.

The control apparatus 40 includes a computer system. The control apparatus 40 includes an arithmetic processing unit 41 including a processor such as a central processing unit (CPU), a storage device 42 including a memory and a storage such as a read only memory (ROM) or a random access memory (RAM), and an input-output interface 43.

The control apparatus 40 is connected with a wireless communication device 44. The wireless communication device 44 is disposed in the dump truck 2. The control apparatus 40 communicates with the management apparatus 10 via the wireless communication device 44 and the communication system 9.

The control apparatus 40 is connected with the driving apparatus 31, a braking apparatus 32, and the steering apparatus 33. In addition, the control apparatus 40 is connected with a position detector 34 and a detection device 35. The driving apparatus 31, the braking apparatus 32, the steering apparatus 33, the position detector 34, and the detection device 35 are mounted on the dump truck 2.

The driving apparatus 31 operates for driving the travel apparatus 23 of the dump truck 2. The driving apparatus 31 generates driving force for driving the travel apparatus 23. The driving apparatus 31 generates driving force for rotating the rear wheels 25R. The driving apparatus 31 includes an internal-combustion engine such as a diesel engine, for example. In addition, the driving apparatus 31 may include a generator that generates power by the operation of the internal-combustion engine, and an electrical motor that operates based on the power generated by the generator.

The braking apparatus 32 operates for braking the travel apparatus 23. The traveling of the travel apparatus 23 decelerates or stops by the operation of the braking apparatus 32.

The position detector 34 detects an absolute position of the dump truck 2. The position detector 34 includes a GNSS antenna that receives a GNSS signal from the positioning satellites 5, and a GNSS calculator that calculates an absolute position of the dump truck 2 based on the GNSS signal received by the GNSS antenna.

The detection device 35 detects a travel direction of the dump truck 2. The detection device 35 includes a steering angle sensor 35A that detects a steering angle of the dump truck 2 that is made by the steering apparatus 33, and an azimuth angle sensor 35B that detects an azimuth angle of the dump truck 2. The steering angle sensor 35A includes, for example, a rotary encoder provided in the steering apparatus 33. The azimuth angle sensor 35B includes, for example, a gyro sensor provided in the vehicle body frame 21.

In addition, the control apparatus 40 is connected with an obstacle sensor 36. For example, the obstacle sensor 36 is disposed on a bottom portion of an anterior portion of the vehicle body frame 21. The obstacle sensor detects an obstacle that exists in front of the dump truck 2, in a noncontact manner. In the present embodiment, the obstacle sensor 36 includes a plurality of radars and a laser sensor being a noncontact sensor. The radars emit radio waves and irradiate an obstacle with the radio waves, and receive radio waves reflected by the obstacle. The radars can thereby detect a direction and a distance of the obstacle with respect to the radars. The laser sensor detects a position of an object that exists around the dump truck 2. The laser sensor emits laser beams and irradiates an obstacle being the object, with the laser beams, and receives laser beams reflected by the obstacle. The laser sensor can thereby detect a direction and a distance of the obstacle with respect to the laser sensor. Because the laser sensor emits laser beams and receives reflected laser beams, the laser sensor has resolution higher than that of the radars.

The arithmetic processing unit 41 includes a data acquisition unit 411 and a drive control unit 412. The data acquisition unit 411 acquires data such as the course data CD generated by the course data generation unit 112 of the management apparatus 10.

Based on the course data CD acquired by the data acquisition unit 411, the drive control unit 412 outputs a drive control signal that controls at least one of the driving apparatus 31, the braking apparatus 32, and the steering apparatus 33 of the dump truck 2. The drive control signal includes an accelerator signal to be output to the driving apparatus 31, a braking command signal to be output to the braking apparatus 32, and a steering command signal to be output to the steering apparatus 33.

In addition, the drive control unit 412 includes a controller for calculating a position of the dump truck 2 using a method such as scan matching navigation, for example, based on map data created in advance and a detection result of the above-described laser sensor, and performing a travel mode of causing the dump truck 2 to travel without depending on the GNSS, based on the calculated position of the dump truck 2. In this case, the map data is stored in, for example, the storage device 12 of the management apparatus 10. Alternatively, the map data may be stored in the storage device 42 of the dump truck 2 or a storage device 52 (described later) of the loader 3. In addition, the drive control unit 412 may be able to update the map data based on the detection result of the above-described laser sensor.

The control apparatus 50 includes a computer system. The control apparatus 50 includes an arithmetic processing unit 51 including a processor such as a central processing unit (CPU), the storage device 52 including a memory and a storage such as a read only memory (ROM) or a random access memory (RAM), and an input-output interface 53.

The control apparatus 50 is connected with a wireless communication device 54. The wireless communication device 54 is disposed in the loader 3. The control apparatus 50 communicates with the management apparatus 10 via the wireless communication device 54 and the communication system 9.

The control apparatus 50 is connected with the input device 55 and a display device 56. The input device 55 and the display device 56 are installed in the loader 3. The input device 55 includes at least one of a computer keyboard, a mouse, and a touch panel, for example. Input data generated by the input device 55 being operated is output to the arithmetic processing unit 51. The display device 56 includes a flat-panel display such as a liquid crystal display (LCD) or an organic electroluminescence display (OELD).

The control apparatus 50 is connected with a position detector 57. The position detector 57 detects an absolute position of the loader 3. The position detector 57 includes a GNSS antenna that receives a GNSS signal from the positioning satellites 5, and a GNSS calculator that calculates an absolute position of the loader 3 based on the GNSS signal received by the GNSS antenna.

The arithmetic processing unit 51 includes a display control unit 511 and a data acquisition unit 512. The display control unit 511 controls a display operation in the display device 56. The display control unit 511 outputs display data to the display device 56. The display data includes map data of the work location PA. The data acquisition unit 512 acquires various types of data. The data acquisition unit 512 acquires, for example, the map data of the work location PA, and the like.

When a loading operation is performed by the loader 3, an operator of the loader 3 inputs an instruction of a loading start using the input device 55. Based on the input from the operator, the control apparatus 50 transmits the instruction of the loading start and position data of the loader 3 to the management apparatus 10. When the management apparatus 10 receives the instruction of the loading start and the position data, the management apparatus 10 estimates a position of a bucket of the loader 3 based on the received position data, and calculates position data of a loading point. Then, the course data generation unit 112 generates the course data CD based on the position data of the loading point, and transmits the course data CD to the dump truck 2.

The dump truck 2 acquires the course data CD using the data acquisition unit 411. Based on the acquired course data CD, the drive control unit 412 outputs a drive control signal that controls at least one of the driving apparatus 31, the braking apparatus 32, and the steering apparatus 33 of the dump truck 2.

If abnormality occurs in an ionization layer when the dump truck 2 travels on the work location PA and the conveying road HL of the mine, the accuracy of a position detected using the GNSS deteriorates, and the accuracy of a position of the dump body 22 that is to be calculated deteriorates. In this case, the accuracy of course data of the dump truck 2 deteriorates, and the accuracy of operations deteriorates. Thus, productivity in the mine may deteriorate. Thus, in the present embodiment, based on positional relationship between a target object with identified position data, and a target point input by the input device 55, target position data of the target point of the dump truck 2 in the work location PA is calculated, and the course data CD of the dump truck 2 is generated based on the calculated target position data.

Figure 4:
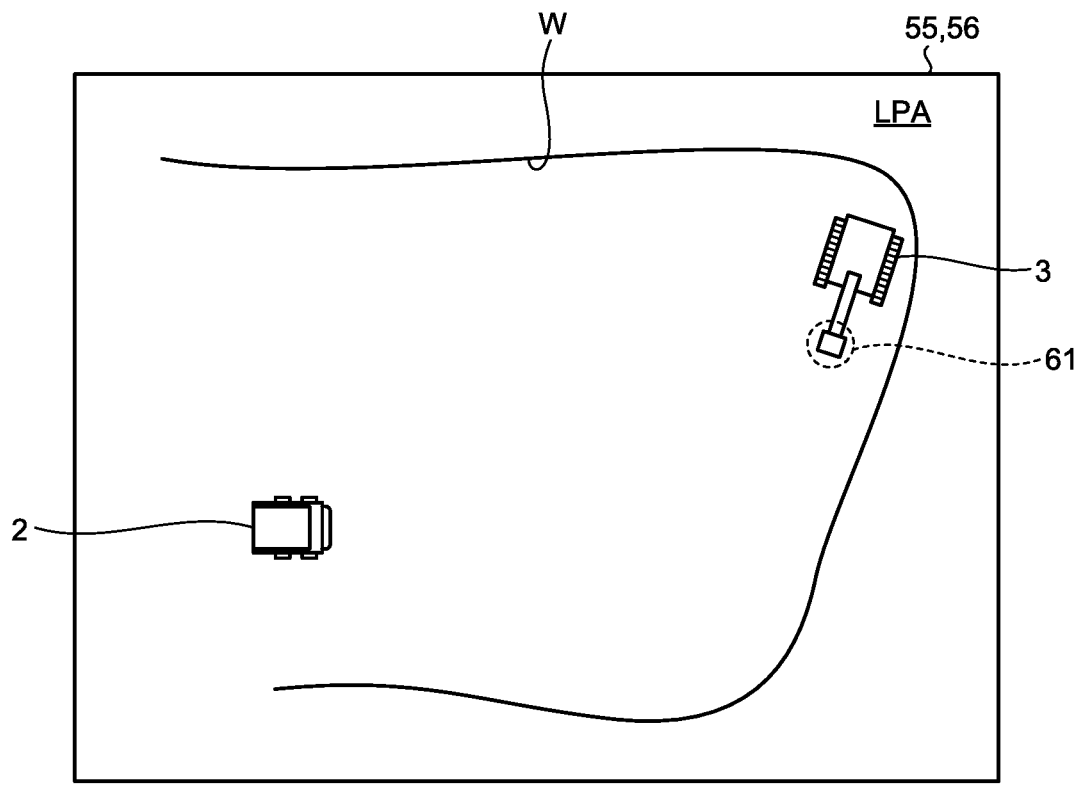
FIG. 4 is a schematic diagram illustrating a procedure of generating course data to a loading point in a loading site.

FIGS. 4 to 7 are diagrams each illustrating an example of a display image displayed on the display device 56 of the loader 3. A procedure of generating course data to a loading point in the loading site LPA will be described below using the display image. The management apparatus 10 transmits map data to the loader 3, and displays the map data on the display device 56 as illustrated in FIG. 4. The map data includes position data of a wall portion W, for example. The position data of the wall portion W is position data already identified in a work performed so far.

In this state, the operator of the loader 3 selects a loading point on the map data, using the input device 55. When the input device 55 is a touch panel, by the operator touching a display screen of the display device 56, a loading point is set on a local coordinate corresponding to a touched portion 61 on the display screen. In addition, the local coordinate is a two-dimensional coordinate indicating a position on the display screen. The control apparatus 50 of the loader 3 transmits an input point to the management apparatus 10.

Figure 5:
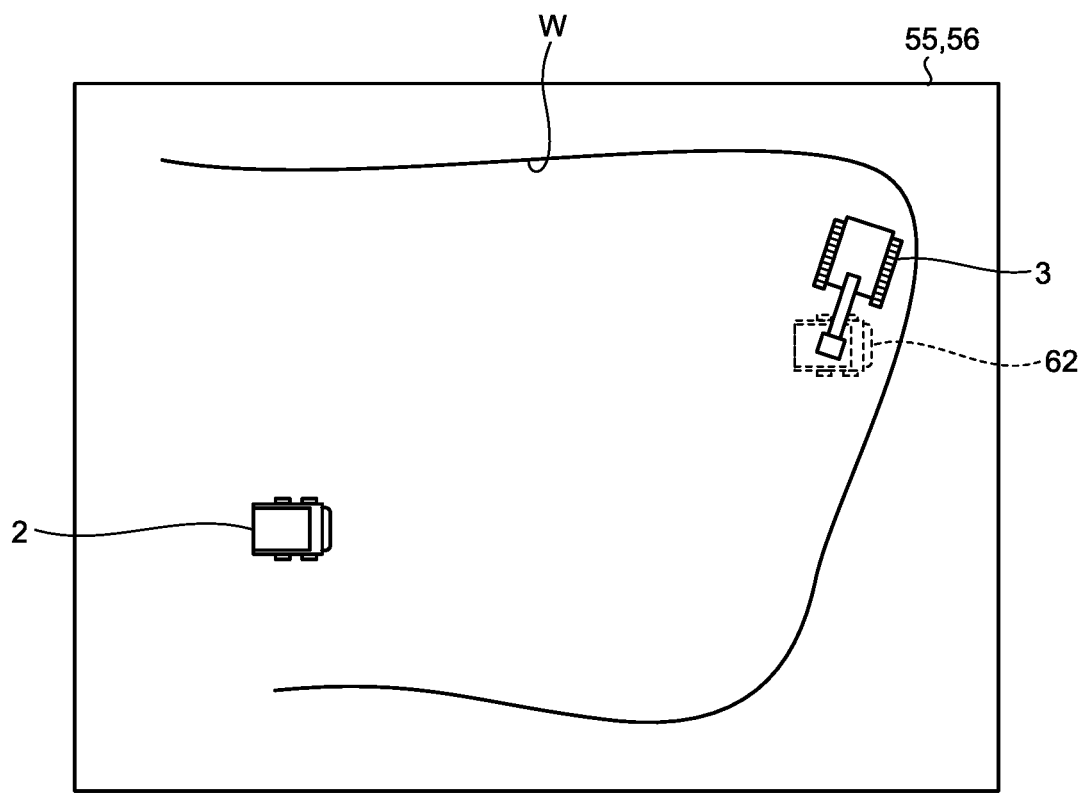
FIG. 5 is a schematic diagram illustrating a procedure of generating course data to a loading point in a loading site.

When the management apparatus 10 receives the input point, the target position data calculation unit 111 converts the local coordinate of the loading point into a global coordinate, and calculates position data of the loading point in the global coordinate. For example, position data of the wall portion W has been identified because the position data has been created by causing a manned vehicle to travel when the map data is created. Thus, the target position data calculation unit 111 calculates, as position data, the global coordinate of the loading point that is obtainable when one point of the wall portion W with the identified position data is set as an origin (reference point). In addition, a target object other than the wall portion W may be set as an origin (reference point) as long as position data of the target object is identified. Examples of such a target object include a borderline that separates the inside and outside of a region in which the dump truck 2 can travel, and the like. Position data of the borderline has been identified because the position data has been created by causing the above-described manned vehicle to travel. In addition, the target position data calculation unit 111 can calculate target position data by calculating a displacement based on a distance between the reference point of the wall portion W and the input point on the map, and an azimuth direction, and adding the displacement to the position data of the reference point of the wall portion W. In addition, the target position data calculation unit 111 can arbitrarily set the reference point of the wall portion W. The target position data calculation unit 111 transmits a calculation result to the loader 3. When the loader 3 receives the calculation result, the display control unit 511 displays an icon 62 of the dump truck 2 at a location on the map on the display screen that corresponds to the position data of the input point, as illustrated in FIG. 5.

Figure 6:
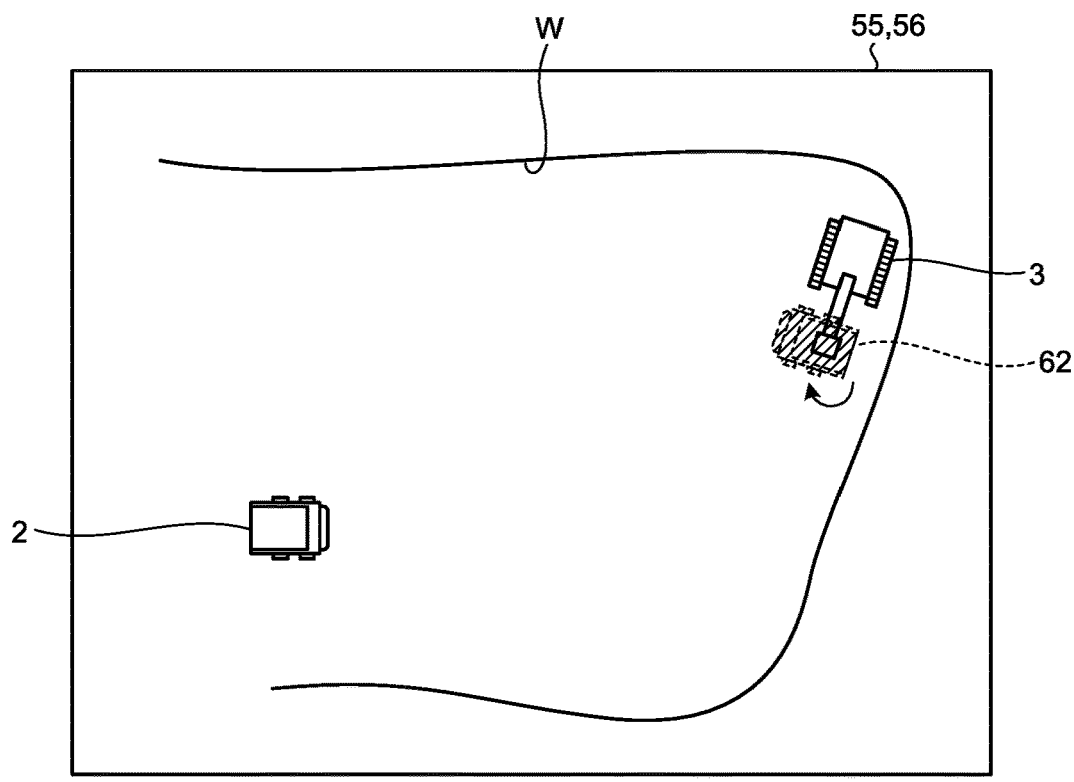
FIG. 6 is a schematic diagram illustrating a procedure of generating course data to a loading point in a loading site.

The icon 62 indicates information about a position and a direction on the map of the dump truck 2 with respect to the wall portion W. For example, the direction of the icon 62 can be set to the same direction as a direction of the dump truck 2 at a time point at which the operator has selected the target point. In the state illustrated in FIG. 5, the icon 62 indicates that the front direction of the front-back direction of the vehicle faces the wall portion W side. Using the input device 55 (touch panel), the operator of the loader 3 can change the position and the direction on the map of the icon 62 by moving in parallel or rotating the icon 62, for example, as illustrated in FIG. 6. In this case, similarly to the case of calculating the position data of the loading point, the target position data calculation unit 111 converts an input of the input device 55 into a global coordinate, and calculates a parallel movement and a rotational movement in a case in which one point of the wall portion W with the identified position data is set as an origin (reference point). In addition, also in this case, a target object other than the wall portion W may be set as an origin (reference point) as long as position data of the target object is identified. In the example illustrated in FIG. 6, the icon 62 indicates a state in which the back direction of the front-back direction faces the wall portion W. In addition, the operator of the loader 3 can determine the position and the direction on the map of the icon 62 using the input device 55. When the position and the direction on the map of the icon 62 is changed or determined, the control apparatus 50 transmits the changed position and direction on the map of the icon 62 or the determined position and direction on the map of the icon 62 to the management apparatus 10.

When the management apparatus 10 receives the changed position and direction on the map of the icon 62, the target position data calculation unit 111 calculates changed position data. In addition, when the management apparatus 10 receives the determined position and direction on the map of the icon 62, the target position data calculation unit 111 calculates determined position data, that is, target position data.

After the target position data has been calculated, the course data generation unit 112 generates course data based on the calculated target position data. In this case, the course data generation unit 112 generates the course data CD based on the target position data, that is, the position data of the loading point that has been input by the input device 55 of the loader 3 and converted into the global coordinate, and the position data of the dump truck 2. For example, the position data of the dump truck 2 is a global coordinate of a point preset on the travel route and at an entrance of the loading site. In addition, as one of traveling conditions, the course data generation unit 112 calculates direction data that is based on the direction of the icon 62, and generates course data using the calculated direction data. The icon 62 illustrated in FIG. 6 indicates a state in which the back direction of the vehicle faces the wall portion W.

Figure 7:
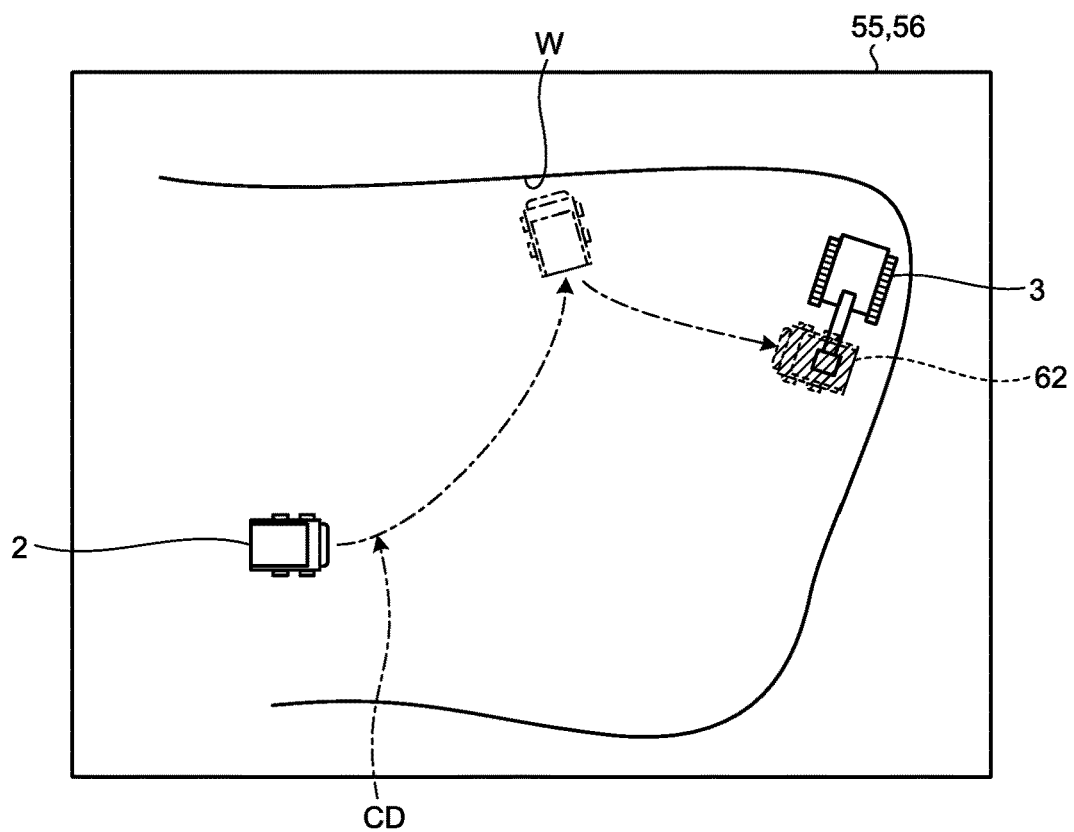
FIG. 7 is a schematic diagram illustrating a procedure of generating course data to a loading point in a loading site.

Thus, the course data CD is generated so that switchback is performed and the dump truck 2 reaches the loading point in a state in which the back direction of the dump truck 2 faces the wall portion W, as illustrated in FIG. 7. The switchback refers to an operation in which the dump truck 2 going forward switches a traveling direction at a sharp angle, and goes backward. In the dump truck 2, when the data acquisition unit 411 acquires the course data CD, the drive control unit 412 causes the dump truck 2 to travel according to the course data CD without depending on the GNSS, using the scan matching navigation, for example.

[Control Method]

Figure 8:
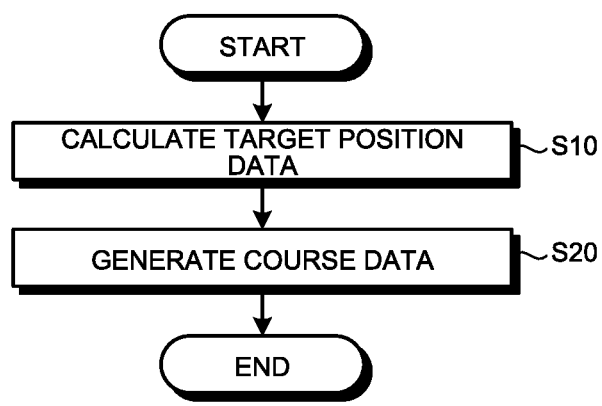
FIG. 8 is a flowchart illustrating an example of a control method of the dump truck according to the present embodiment.

Next, an example of a control method of the dump truck 2 according to the present embodiment will be described. FIG. 8 is a flowchart illustrating an example of a control method of the dump truck 2 according to the present embodiment. Thus, the control method of the dump truck 2 includes calculating the target position data of the target point of the dump truck 2 in the work location PA based on positional relationship between a target object with identified position data, and a target point input by the input device 55 (Step S10), and generating the course data CD of the dump truck 2 based on the target position data (Step S20).

Figure 9:
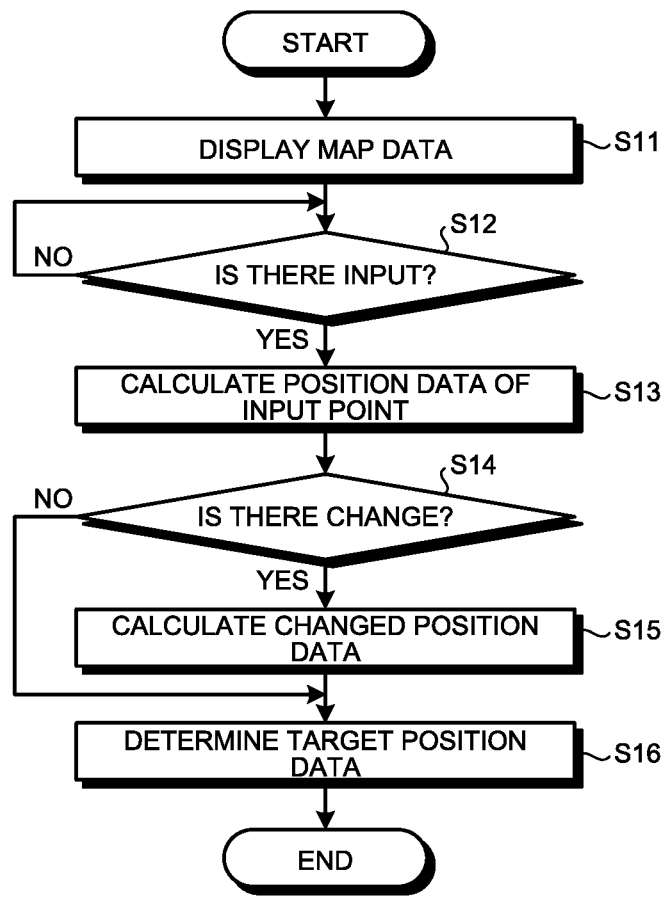
FIG. 9 is a flowchart illustrating an operation in Step S10 in detail.

FIG. 9 is a flowchart illustrating an operation in Step S10 in detail. As illustrated in FIG. 9, in Step S10, the management apparatus 10 transmits map data to the loader 3 and displays the map data on the display device 56 (Step S11). After that, the management apparatus 10 determines whether a point on the map has been input from the loader 3 side (Step S12). When there is no input from the loader 3 side (No in Step S12), the management apparatus 10 repeatedly performs the determination in Step S11. When an input point transmitted from the loader 3 side has been received (Yes in Step S12), the target position data calculation unit 111 calculates position data of the input point based on positional relationship with the wall portion W with identified position data (Step S13).

After that, the target position data calculation unit 111 determines whether a changed input point has been transmitted from the loader 3 side, that is, determines whether the input point has been changed (Step S14). When the target position data calculation unit 111 determines that the input point from the loader 3 side has been changed (Yes in Step S14), the target position data calculation unit 111 calculates changed position data (Step S15), and determines the calculated position data as target position data (Step S16). In addition, when the target position data calculation unit 111 determines that the input point from the loader 3 side has not been changed (No in Step S14), the target position data calculation unit 111 determines the already-calculated position data as target position data (Step S16).

In Step S20, the course data generation unit 112 generates the course data CD based on the target position data determined in Step S16. The course data generation unit 112 transmits the generated course data CD to the dump truck 2.

As described above, the control system 100 of the transporter vehicle according to the present embodiment includes the target position data calculation unit 111 that calculates target position data of a target point of the dump truck 2 in the work location PA, based on positional relationship between a target object with identified position data, such as the wall portion W, and the target point of the dump truck 2 that is input by the input device 55, and the course data generation unit 112 that generates the course data CD of the dump truck 2 at least based on the target position data.

According to the present embodiment, when the accuracy of position detection that uses the GNSS deteriorates due to abnormality that occurs in the ionization, or the like, a target point and course data of the dump truck 2 can be generated without depending on the GNSS. An accuracy deterioration of operations can be thereby suppressed also when the accuracy of position detection that uses the GNSS deteriorates. Thus, a deterioration of productivity in a work location is suppressed.

In the control system 100 of the transporter vehicle according to the present embodiment, the target position data calculation unit 111 calculates target position data based on position data input by an external input unit such as the input device 55 of the loader 3. Thus, setting of an input position can be easily performed. For example, a loading point of the loader 3 in the loading site LPA can be input as a target point by the input device 55 provided in the loader 3. Thus, a more accurate position can be input.

Second Embodiment

Subsequently, the second embodiment will be described. In the second embodiment, a method of the control system 100 of the transporter vehicle 2 calculating target position data is different from that in the first embodiment. Thus, the method of calculating the target position data will be mainly described. In the second embodiment, the same components as those in the control system 100 of the transporter vehicle 2 according to the first embodiment are assigned the same signs, and the description will be omitted or simplified.

Figure 10:
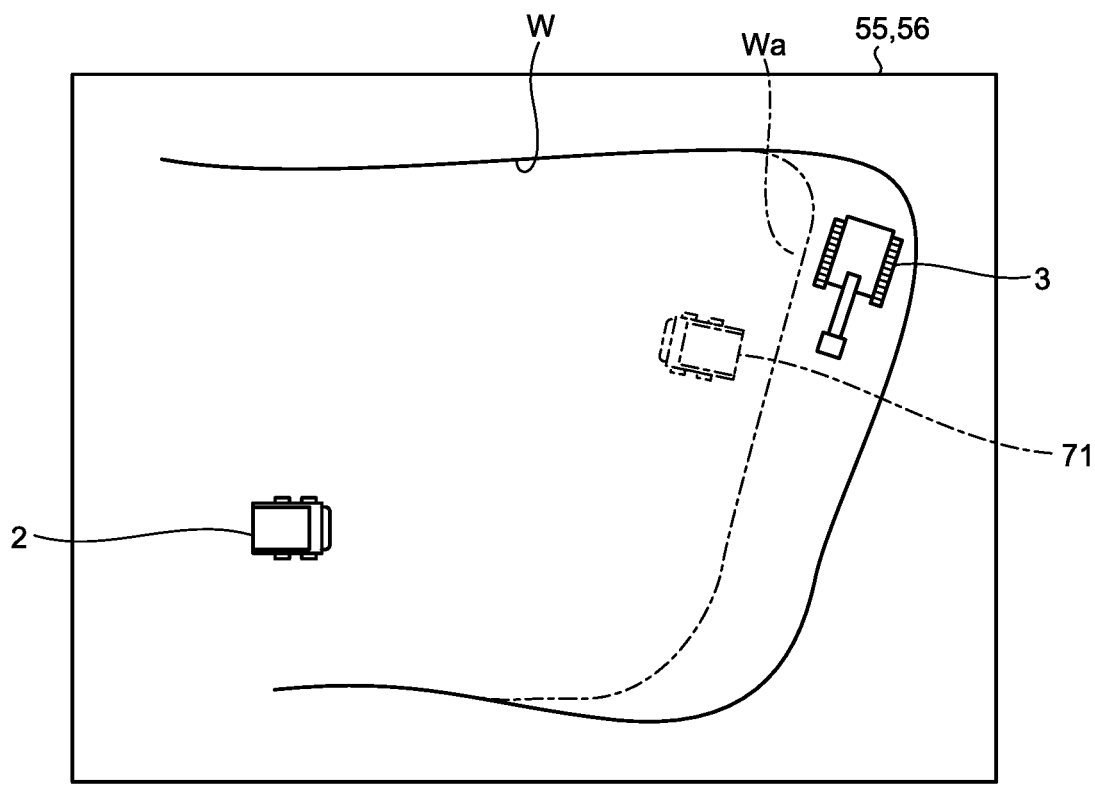
FIG. 10 is a schematic diagram illustrating a procedure of generating course data to a loading point in a loading site according to a second embodiment.
Figure 11:
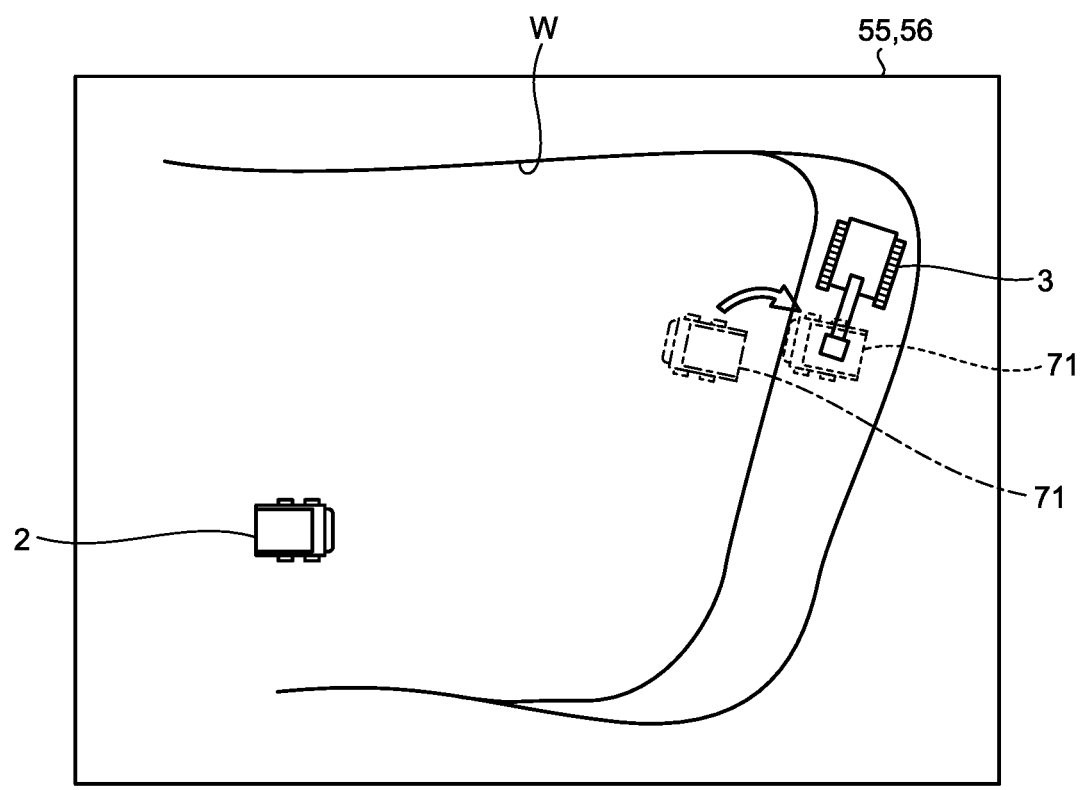
FIG. 11 is a schematic diagram illustrating a procedure of generating course data to a loading point in a loading site.

FIGS. 10 and 11 are diagrams each illustrating an example of a display image displayed on the display device 56 of the loader 3. A procedure of generating course data to a loading point in the loading site LPA will be described below using the display image. For example, in the loading site LPA, part of the wall portion W is excavated by the loader 3 such as an excavator. In this case, as the excavation progresses, an actual position of the wall portion W moves to a position Wa on the outside of the loading site LPA. In this manner, in the loading site LPA, the shape of the wall portion W varies from hour to hour by the excavation, and the loader 3 moves. Thus, a loading point of the dump truck 2 varies according to the moved position of the loader 3.

Thus, when a loading operation is performed by the loader 3, when the operator of the loader 3 inputs an instruction of a loading start using the input device 55, and the instruction of the loading start is transmitted to the management apparatus 10, the management apparatus 10 may calculate target position data based on a target point of the dump truck 2 that has been set in the past, that is, set as target position data at a time point equal to or before a time point at which the target position data has been calculated. The target point of the dump truck 2 that has been set in the past may be, for example, a loading point equal to or preceding the last loading point. Position data and the like of the loading point equal to or preceding the last loading point can be stored in the storage device 12.

The description will be given below using a loading point in the last loading as an example of a target point of the dump truck 2 that has been set in the past. Nevertheless, the target point is not limited to this. In this case, the target position data calculation unit 111 sets position data of the dump truck 2 in the last loading as tentative target position data. The target position data calculation unit 111 transmits the set tentative target position data to the loader 3. When the loader 3 receives the calculation result, the display control unit 511 displays an icon 71 of the dump truck 2 at a location on the map on the display screen that corresponds to the position data of the input point, as illustrated in FIG. 10. In this case, the direction of the icon 71 can be set to the same direction as a direction in the last loading, for example.

In the state illustrated in FIG. 10, the icon 71 indicates that the back direction of the front-back direction of the vehicle faces the wall portion W side. Using the input device 55 (touch panel), the operator of the loader 3 can change the position and the direction on the map of the icon 71 by moving the icon 71 in parallel or the like, as illustrated in FIG. 11, for example. In the example illustrated in FIG. 11, the position of the icon 71 has been changed to a shovel portion of the icon 71 of the loader 3 on the map. In addition, the operator may change the direction of the icon 71. When the position and the direction on the map of the icon 71 is changed or determined, the control apparatus 50 transmits the changed position and direction on the map of the icon 71 or the determined position and direction on the map of the icon 71 to the management apparatus 10.

When the management apparatus 10 receives the changed position and direction on the map of the icon 71, the target position data calculation unit 111 calculates changed tentative target position data. At this time, the target position data calculation unit 111 calculates the changed tentative target position data based on positional relationship between position data of a loading point in the last loading, and the changed icon 71. For example, the target position data calculation unit 111 can calculate the tentative target position data by calculating a displacement in an absolute coordinate based on a movement amount and a movement direction of the icon 71 on the map, and adding the displacement to the position data of the last loading point. In addition, when the management apparatus 10 receives the determined position and direction on the map of the icon 71, the target position data calculation unit 111 calculates determined tentative target position data, that is, target position data.

Figure 12:
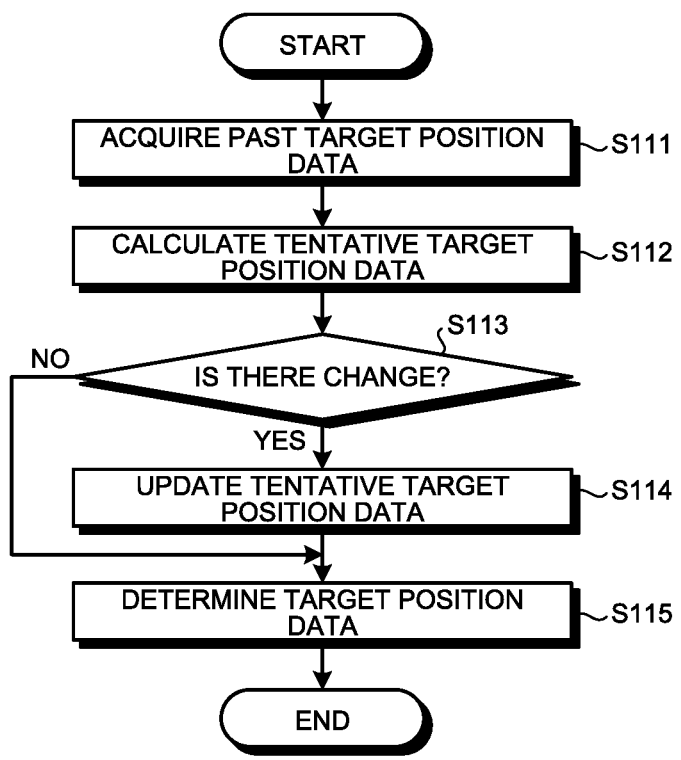
FIG. 12 is a flowchart illustrating an example of a control method of the dump truck according to the present embodiment.

FIG. 12 is a flowchart illustrating another example of a control method of the dump truck 2. FIG. 12 illustrates an operation performed in the case of calculating target position data based on a target point of the dump truck 2 that has been set in the past. As illustrated in FIG. 12, the target position data calculation unit 111 acquires past target position data indicating a position of the last loading point, from the storage device 12 (Step S111), and calculates the tentative target position data based on the past target position data (Step S112). After that, the management apparatus 10 determines whether the tentative target position data has been changed (Step S113). When the target position data calculation unit 111 determines that the tentative target position data has been changed (Yes in Step S113), the target position data calculation unit 111 calculates changed position data and updates the tentative target position data (Step S114), and determines the updated tentative target position data as target position data (Step S115). In addition, when it is determined that the tentative target position data has not been changed (No in Step S113), the target position data calculation unit 111 directly determines the tentative target position data as target position data (Step S115).

In this manner, when the accuracy of position detection that uses the GNSS deteriorates due to abnormality that occurs in the ionization, or the like, a target point and course data of the dump truck 2 can be generated without depending on the GNSS, by calculating target position data based on a target point of the dump truck 2 that has been set in the past. An accuracy deterioration of operations can be thereby suppressed also when the accuracy of position detection that uses the GNSS deteriorates. Thus, a deterioration of productivity in a work location is suppressed.

The technical scope of the present invention is not limited to the above-described embodiments, and changes can be appropriately added without departing from the scope of the present invention. For example, by presetting a distance between the wall portion W and a loading point serving as a target point of the dump truck 2, calculation of target position data can be effectively performed.

Figure 13:
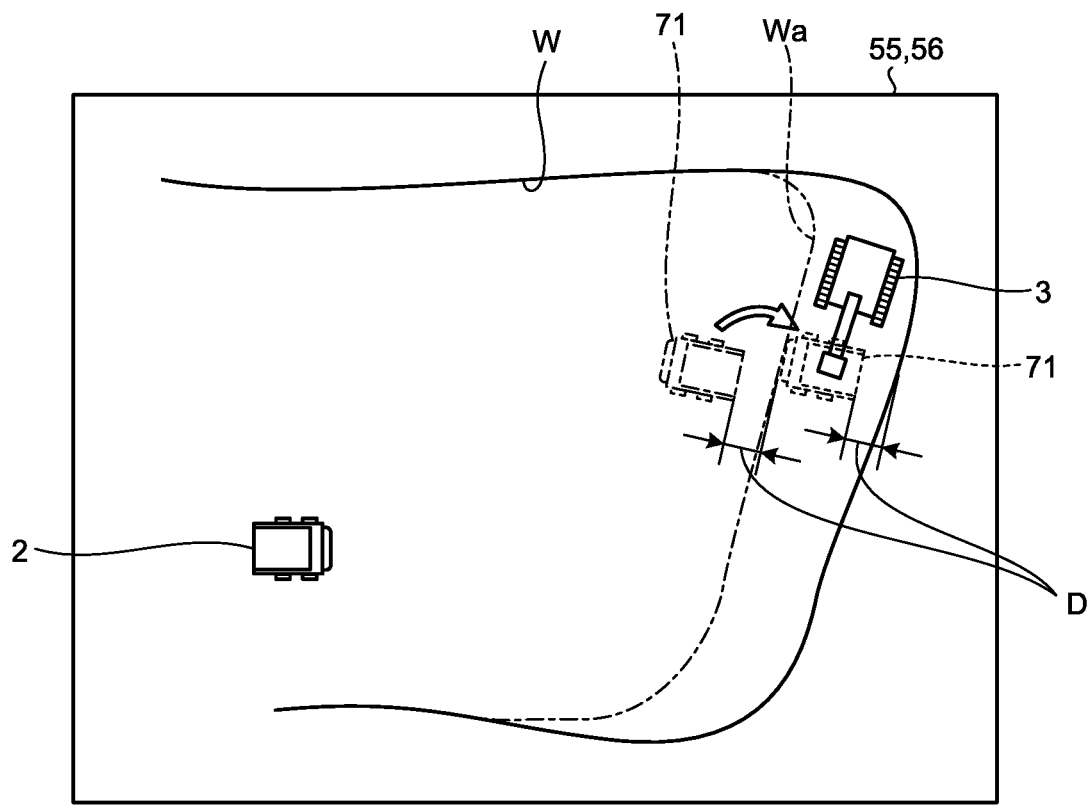
FIG. 13 is a schematic diagram illustrating a modified example of a procedure of generating course data to a loading point in a loading site.

FIGS. 13 to 16 are diagrams each illustrating another example of a display image displayed on the display device 56 of the loader 3. A modified example of a procedure of generating course data to a loading point in the loading site LPA will be described below using the display image. As illustrated in FIG. 13, for example, in the above-described second embodiment, by setting a distance between a loading point and the wall portion W to a predetermined distance D, when the tentative target position data is set, the tentative target position data can be automatically changed to a position at which a distance from the wall portion W becomes the distance D. In this case, display can be performed on the display device 56 of the loader 3 in such a manner that the icon 71 is first displayed at a point on the map that corresponds to the tentative target position data, and then, the icon 71 automatically moves. In addition, an icon 72 may be additionally displayed together at the position on the map that corresponds to the changed tentative target position data. The operator can change the position and the direction based on the moved icon 71 or the additionally-displayed icon 72. In addition, as illustrated in FIG. 13, also when the position of the wall portion W varies, position data of a target point can be calculated by creating and updating position data of the wall portion W by causing the above-described manned vehicle to periodically travel.

Figure 14:
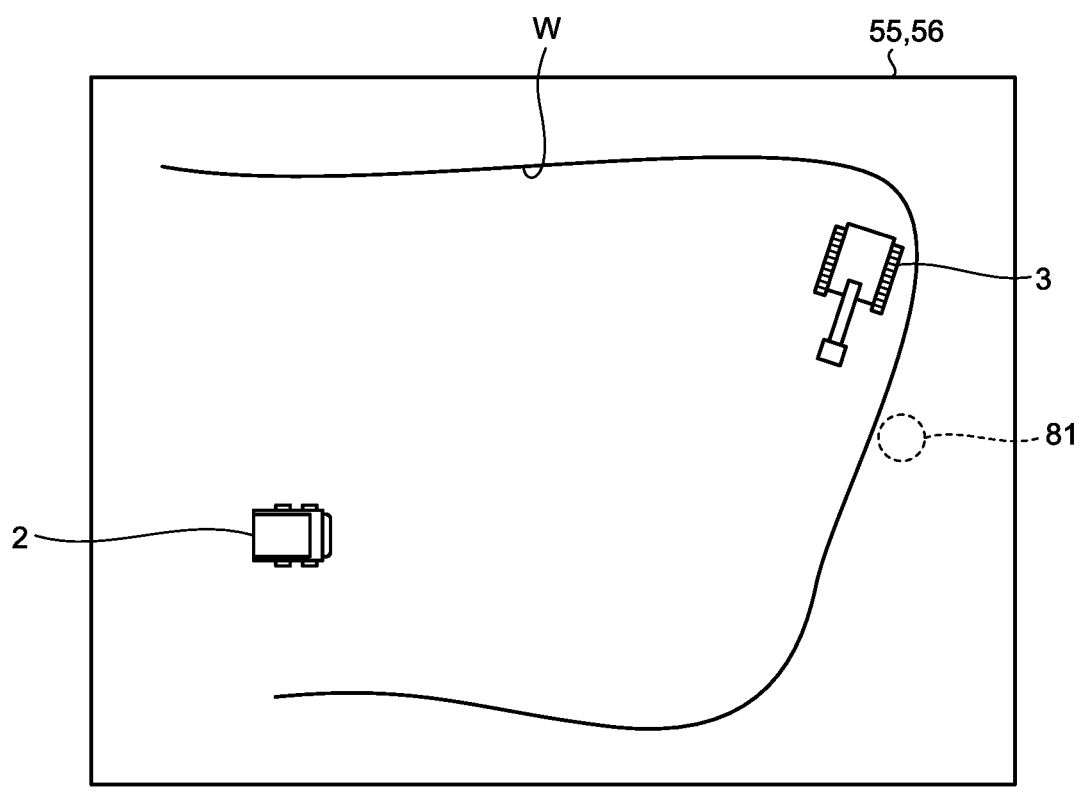
FIG. 14 is a schematic diagram illustrating a modified example of a procedure of generating course data to a loading point in a loading site.

In addition, in the above-described first embodiment, the description has been given using, as an example, a case in which the operator selects a target point on the map using the input device 55. For example, as illustrated in FIG. 14, when a point 81 on the map that has been touched by the operator is on the outside of an operable region of the dump truck 2, such as a portion overlapping the wall portion W, for example, the target position data calculation unit 111 may cancel out the input of the point, and avoid calculating target position data. Contact between the dump truck 2 and an obstacle existing around the dump truck 2 can be thereby suppressed.

In addition, in the above-described first embodiment, the description has been given using an example in which, when the target position data calculation unit 111 sets a direction of the icon 62, that is, a direction of the dump truck 2 at a target point after the operator selects the target point on the map using the input device 55, the direction is set to be the same direction as the direction of the dump truck 2 at a time point at which the operator has selected the target point. Nevertheless, the direction is not limited to this. For example, the target position data calculation unit 111 may set a direction of the dump truck 2 at a target point according to the course data CD generated by the course data generation unit 112.

Figure 15:
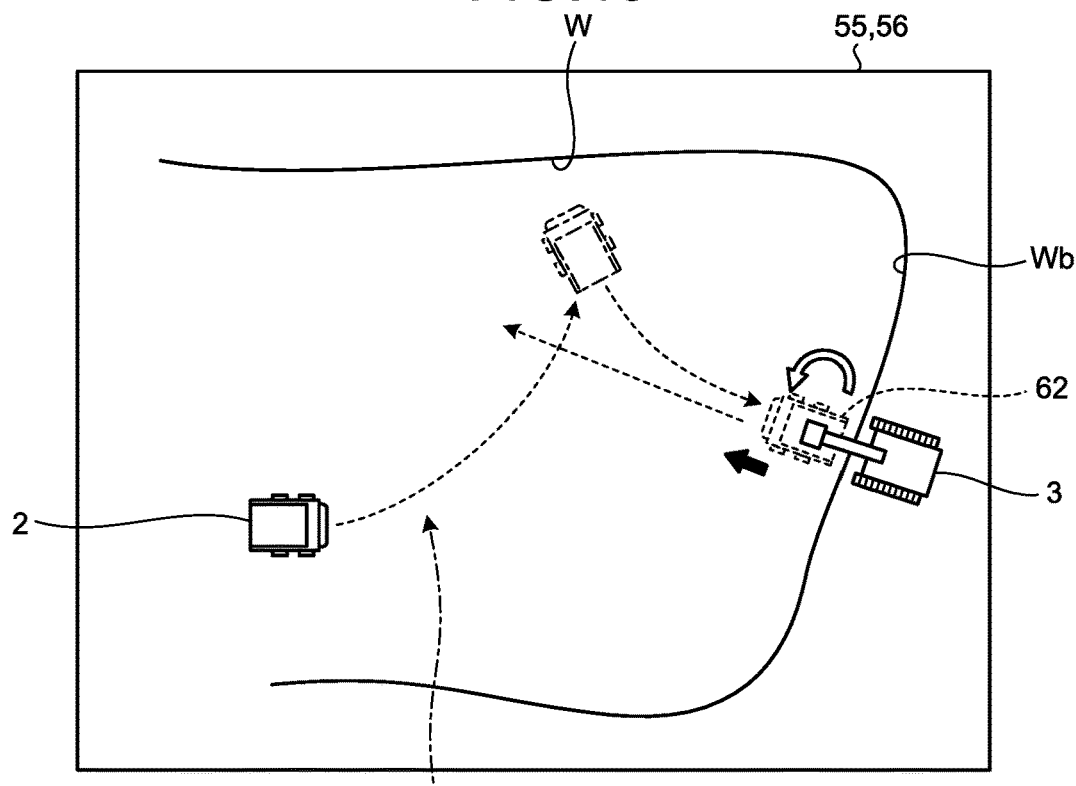
FIG. 15 is a schematic diagram illustrating a modified example of a procedure of generating course data to a loading point in a loading site.

More specifically, as illustrated in FIG. 15, for example, when course data C1 of reaching a target point while going backward is set as in the case of performing a switchback operation, the target position data calculation unit 111 can set or change a direction of the dump truck 2 at the target point so that the back direction of the front-back direction faces a wall surface Wb of the wall portion W.

Figure 16:
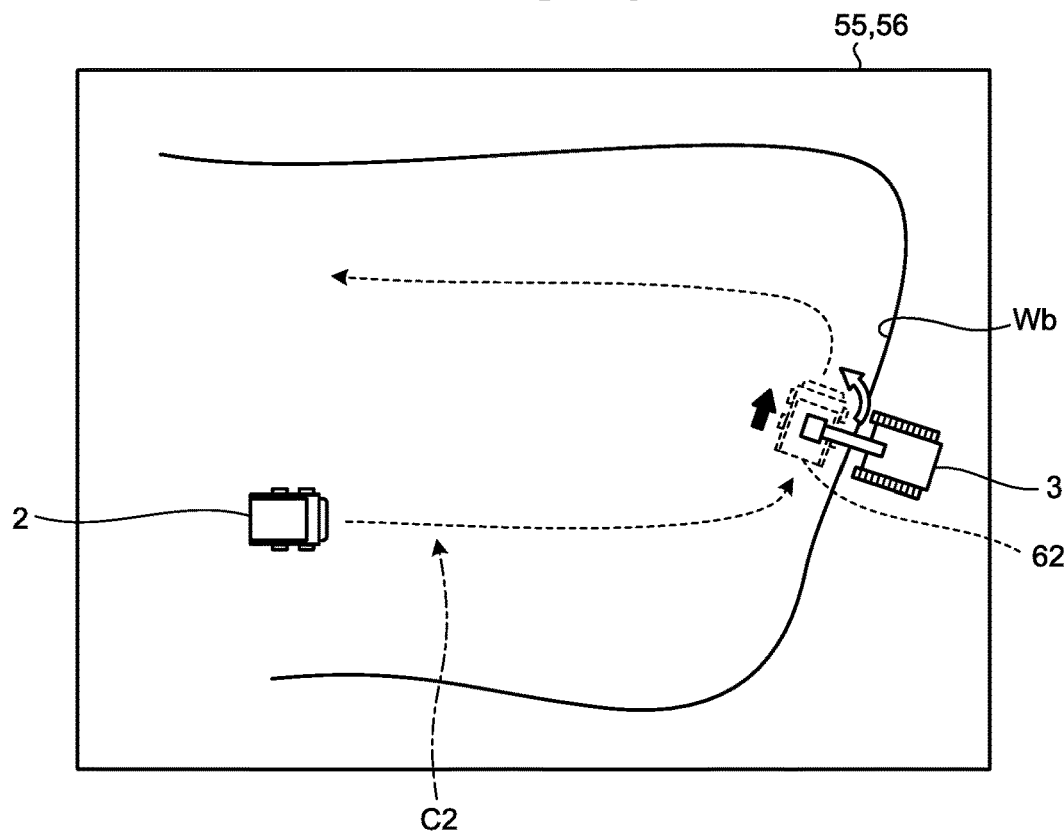
FIG. 16 is a schematic diagram illustrating a modified example of a procedure of generating course data to a loading point in a loading site.

In addition, as illustrated in FIG. 16, when course data C2 of reaching a target point while going forward is set, the target position data calculation unit 111 can set or change a direction of the dump truck 2 at the target point so that a lateral of the front-back direction faces the wall surface Wb of the wall portion W. In this case, the front-back direction of the dump truck 2 can be set according to an entry direction to the loading point.

In this manner, a direction of the dump truck 2 at a target point is automatically set or changed according to the course data C1 or C2. Thus, a target point can be set more easily and effectively.

In addition, in the aforementioned embodiments, the dump truck 2 is assumed to be an unmanned dump truck. The dump truck 2 may be a manned dump truck that travels according to an operation of a driver that rides in the dump truck 2.

In addition, in the aforementioned embodiments, the description has been given using a transporter vehicle used in a mine, as an example. The components described in the aforementioned embodiments may be applied to a transporter vehicle used in a work location different from a mine. In addition, the transporter vehicle needs not be the dump truck 2.

In addition, in the aforementioned embodiments, the description has been given using an example configuration in which the target position data calculation unit 111, the course data generation unit 112, and the course data acquisition unit 113 are provided in the arithmetic processing unit 11 of the management apparatus 10. Nevertheless, the configuration is not limited to this, and at least one of the above-described units may be provided in the control apparatus 40 of the dump truck 2 or the control apparatus 50 of the loader 3.

In addition, in the aforementioned embodiments, the description has been given using an example case of setting a target position (loading point) by inputting using the input device 55 of the loader 3. The configuration is not limited to this. For example, the configuration may be a configuration of setting a target position such as a loading point by inputting using the input device 15 of the management apparatus 10.

REFERENCE SIGNS LIST

D DISTANCE
C1, C2, CD COURSE DATA
V TRAVEL SPEED
W WALL PORTION
PA WORK LOCATION
HL CONVEYING ROAD
CR CRUSHER
AX ROTATION AXIS
IS INTERSECTION
DPA EARTH UNLOADING SITE
RP TRAVEL ROUTE
LPA LOADING SITE
WB WALL SURFACE
1 MANAGEMENT SYSTEM
2 TRANSPORTER VEHICLE, DUMP TRUCK
2F ANTERIOR PORTION
2R POSTERIOR PORTION
3 LOADER
5 POSITIONING SATELLITE
6 RELAYING DEVICE
7 CONTROL FACILITY
9 COMMUNICATION SYSTEM
10 MANAGEMENT APPARATUS
11, 41, 51 ARITHMETIC PROCESSING UNIT
12, 42, 52 STORAGE DEVICE
13, 43, 53 INPUT-OUTPUT INTERFACE
14, 44, 54 WIRELESS COMMUNICATION DEVICE
15, 55 INPUT DEVICE
16 OUTPUT DEVICE
21 VEHICLE BODY FRAME
22 DUMP BODY
23 TRAVEL APPARATUS
24 TIRE
25 WHEEL
25F FRONT WHEEL
25R REAR WHEEL
26 REAR AXLE
27 WHEEL AXIS
31 DRIVING APPARATUS
32 BRAKING APPARATUS
33 STEERING APPARATUS
34, 57 POSITION DETECTOR
35 DETECTION DEVICE
35A STEERING ANGLE SENSOR
35B AZIMUTH ANGLE SENSOR
36 OBSTACLE SENSOR
40, 50 CONTROL APPARATUS
56 DISPLAY DEVICE 62, 71, 72 ICON
111 TARGET POSITION DATA CALCULATION UNIT
112 COURSE DATA GENERATION UNIT
113 COURSE DATA ACQUISITION UNIT
411, 512 DATA ACQUISITION UNIT
412 DRIVE CONTROL UNIT
511 DISPLAY CONTROL UNIT

The invention claimed is:

1. A control system of a transporter vehicle comprising:
a user input device of a loader machine, configured to display an image of a map of a work site, which includes position data of a target object whose position has been previously identified, the user input device configured to receive a user input designating a target point for the transporter vehicle on the displayed image of the map;
a target position data calculation unit configured to calculate target position data of the target point for the transporter vehicle based on positional relationship between the target object and the target point for the transporter vehicle; and
a course data generation unit configured to generate course data of the transporter vehicle at least based on the target position data.

2. The control system of a transporter vehicle according to claim 1,
wherein the target point indicates a loading point of a loading machine, and
wherein the target position data calculation unit calculates the target position data of the transporter vehicle based on position data of the loading point that has been input by the input device.

3. The control system of a transporter vehicle according to claim 2,
wherein, when the position data input by the input device is on outside of an operable region of the transporter vehicle, the target position data calculation unit avoids calculating the target position data.

4. The control system of a transporter vehicle according to claim 1,
wherein the target position data calculation unit calculates the target position data based on the position data of the target point of the transporter vehicle that has been set in past.

5. The control system of a transporter vehicle according to claim 1,
wherein the course data generation unit generates course data of reaching the target point while going backward, and course data of reaching the target point while going forward, and
wherein the target position data calculation unit sets a direction of the transporter vehicle at the target point according to the course data generated by the course data generation unit.

6. A transporter vehicle controlled by the control system of a transporter vehicle according to claim 1, the transporter vehicle at least comprising the data acquisition unit among the data acquisition unit, the target position data calculation unit, and the course data generation unit.

7. A control method of a transporter vehicle comprising:
displaying, by a user input device of a loader machine, an image of a map of a work site, which includes position data of a target object whose position has been previously identified, and receiving by the user input device, a user input designating a target point for the transporter vehicle on the displayed image of the map;
calculating target position data of the target point for the transporter vehicle based on positional relationship between the target object and the target point of the transporter vehicle; and
generating course data of the transporter vehicle at least based on the target position data.

* * * * *